United States Patent
Zaech

(10) Patent No.: US 12,209,622 B2
(45) Date of Patent: Jan. 28, 2025

(54) ASSEMBLY FOR CONNECTING TWO DRIVE SIDES OF A DRIVE TRAIN OF A RAIL VEHICLE

(71) Applicant: Siemens Mobility GmbH, Munich (DE)

(72) Inventor: Martin Zaech, Raubling (DE)

(73) Assignee: Siemens Mobility GmbH, Munich (DE)

( * ) Notice: Subject to any disclaimer, the term of this patent is extended or adjusted under 35 U.S.C. 154(b) by 735 days.

(21) Appl. No.: 17/606,117

(22) PCT Filed: Apr. 9, 2020

(86) PCT No.: PCT/EP2020/060199
§ 371 (c)(1),
(2) Date: Oct. 25, 2021

(87) PCT Pub. No.: WO2020/216633
PCT Pub. Date: Oct. 29, 2020

(65) Prior Publication Data
US 2022/0307558 A1    Sep. 29, 2022

(30) Foreign Application Priority Data

Apr. 23, 2019 (DE) .......................... 102019205768.3

(51) Int. Cl.
*F16D 3/62* (2006.01)
*B61C 17/00* (2006.01)
(Continued)

(52) U.S. Cl.
CPC ................ *F16D 3/62* (2013.01); *B61C 17/00* (2013.01); *F16D 3/08* (2013.01); *F16D 3/50* (2013.01);
(Continued)

(58) Field of Classification Search
CPC ..... F16D 3/62; F16D 3/60; F16D 3/56; F16D 3/50; F16D 3/64; F16D 3/72; F16D 3/76;
(Continued)

(56) References Cited

U.S. PATENT DOCUMENTS 2,969,658 A * 1/1961 Wellauer .................. F16D 3/52
464/7
3,500,658 A * 3/1970 Goody ...................... F16D 3/78
464/99

(Continued)

FOREIGN PATENT DOCUMENTS

CA       2263230 A1  *  2/1998
CA       2472251 C   * 11/2009 ............... F16D 3/78
(Continued)

*Primary Examiner* — S. Joseph Morano
*Assistant Examiner* — James William Jones
(74) *Attorney, Agent, or Firm* — Laurence A. Greenberg; Werner H. Stemer; Ralph E. Locher

(57) ABSTRACT

An assembly for connecting two drive sides of a drive train of a rail vehicle includes a first drive side having a disc-shaped first coupling body at one end, a second drive side having a disc-shaped second coupling body at one end and a disc-shaped intermediate body disposed between the first coupling body and the second coupling body. The intermediate body is coupled to both the first coupling body and the second coupling body in such a way that a rotational movement of one of the two drive sides is transmitted to the other drive side through the coupled body.

9 Claims, 4 Drawing Sheets

(51) Int. Cl.
*F16D 3/08* (2006.01)
*F16D 3/50* (2006.01)
*F16D 3/56* (2006.01)
*F16D 3/60* (2006.01)
*F16D 3/64* (2006.01)
*F16D 3/72* (2006.01)
*F16D 3/76* (2006.01)
*F16D 3/78* (2006.01)
*B61C 17/10* (2006.01)
*B61C 17/12* (2006.01)

(52) U.S. Cl.
CPC ............... *F16D 3/56* (2013.01); *F16D 3/60* (2013.01); *F16D 3/64* (2013.01); *F16D 3/72* (2013.01); *F16D 3/76* (2013.01); *F16D 3/78* (2013.01); *B61C 17/10* (2013.01); *B61C 17/12* (2013.01)

(58) Field of Classification Search
CPC ... F16D 3/78; F16D 3/08; B61C 17/00; B61C 17/10; B61C 17/12
USPC ............... 105/131, 26.05; 464/51; 295/39
See application file for complete search history.

(56) References Cited

U.S. PATENT DOCUMENTS

| | | |
|---|---|---|
| 5,484,339 A | 1/1996 | Birioukov et al. |
| 10,670,081 B2 | 6/2020 | Huber et al. |
| 10,794,429 B2 | 10/2020 | Huber et al. |
| 2003/0234132 A1* | 12/2003 | Blumke .......... F16D 3/78 180/376 |
| 2012/0061200 A1* | 3/2012 | Yamashita .......... F16D 3/02 192/45.001 |
| 2012/0283028 A1* | 11/2012 | Abe .......... F16D 3/62 464/69 |
| 2017/0292572 A1 | 10/2017 | Huber et al. |

FOREIGN PATENT DOCUMENTS

| | | | | |
|---|---|---|---|---|
| CN | 102252036 A | | 11/2011 | |
| CN | 102725551 A | | 10/2012 | |
| CN | 103052821 A | * | 4/2013 | ............ F16D 3/12 |
| CN | 106795920 A | | 5/2017 | |
| DE | 4038793 A1 | | 6/1992 | |
| DE | 4424893 A1 | * | 1/1996 | ............ F16D 3/62 |
| DE | 102004039796 A1 | | 2/2006 | |
| DE | 102006037888 A1 | | 2/2008 | |
| DE | 102012002757 A1 | | 8/2013 | |
| DE | 102013007126 A1 | * | 6/2014 | ............ F16D 3/58 |
| DE | 102013018534 A1 | | 5/2015 | |
| DE | 102013222753 A1 | * | 5/2015 | ............ F16D 3/62 |
| DE | 102014014490 A1 | | 3/2016 | |
| DE | 102014018842 A1 | | 6/2016 | |
| EP | 0596287 A2 | | 5/1994 | |
| EP | 2626579 A2 | | 8/2013 | |
| FR | 1476687 A | | 4/1967 | |
| WO | WO-2015159488 A1 | * | 10/2015 | ............ F16D 13/40 |
| WO | WO-2016046019 A1 | * | 3/2016 | ............ B61C 9/46 |

* cited by examiner

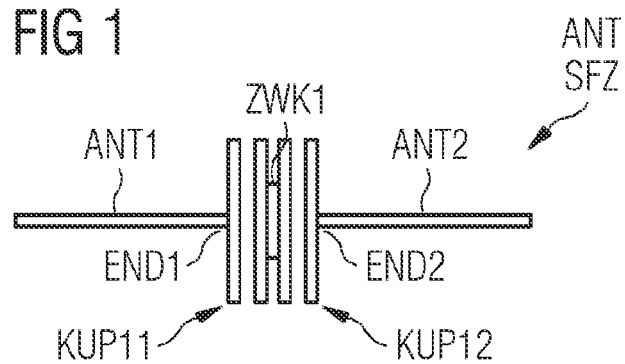
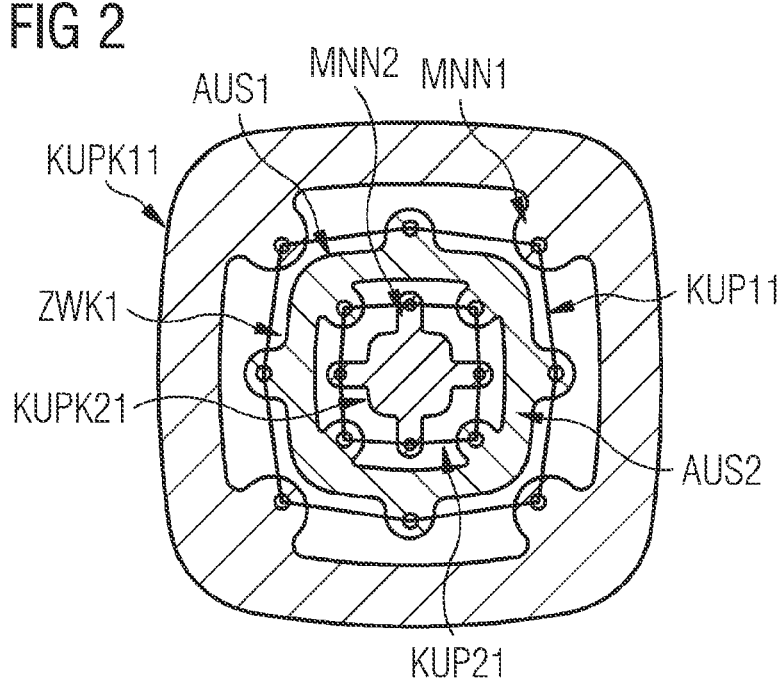
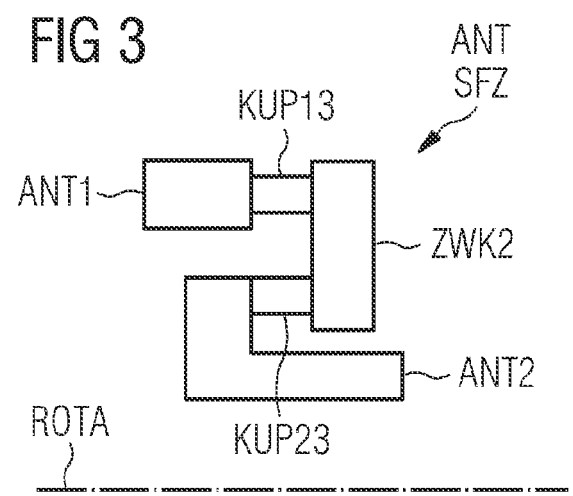

ASSEMBLY FOR CONNECTING TWO DRIVE SIDES OF A DRIVE TRAIN OF A RAIL VEHICLE

FIELD AND BACKGROUND OF THE INVENTION

The invention relates to an arrangement for connecting two drive sides of a drive train of a rail vehicle.

In a drive train of a rail vehicle, use is made of couplings in order to transmit moments of a drive. At the same time, couplings are required in order to permit relative travels and relative angles between components of the drive train.

In this respect, high stiffness and damping requirements are placed on all the components of the drive train.

Here, the stiffness describes a resistance of a body to elastic deformation caused by external influences, such as force or torque.

In particular, in the drive train, couplings used, which if appropriate are connected in series, should be designed in terms of stiffness such that a defined stiffness value is set to avoid damage and to prevent driving vibrations, among other things.

In order to realize required stiffness, it is known to arrange an intermediate shaft, which connects the two couplings to one another axially in series as viewed in the axial direction, between two couplings connected in series.

In this case, this intermediate shaft is preferably in the form of an elongate, cylindrical machine element, which transmits rotational movements and torques between parts that are fixedly connected to the intermediate shaft.

FIG. 7 shows such an arrangement or series circuit of two couplings KUP1, KUP2 with an intermediate shaft ZW.

A first drive side ANT1 is connected to an intermediate shaft ZW via a first coupling KUP1. Correspondingly, the intermediate shaft ZW is connected to a second drive side ANT2 via a second coupling KUP2.

The intermediate shaft ZW has an elongate and cylindrical form here and transmits rotational movements and torques between the two drive sides ANT1 and ANT2.

A chosen length of the intermediate shaft ZW and further configuration parameters of the intermediate shaft ZW make it possible to set a desired overall stiffness and a desired coupling travel of the resulting arrangement. It is disadvantageous that the intermediate shaft ZW requires a correspondingly large installation space, which is not always available, in particular in a rail vehicle.

DE 10 2014 014 490 A1 discloses a coupling device for connecting a motor to a transmission of a rail vehicle, having a fiber-reinforced joint device, having a first flange, which is assigned to the motor, and having a second flange, which is assigned to the transmission 20. The fiber-reinforced joint device couples the first flange and the second flange.

EP 0 596 287 A2 discloses an articulated coupling for the transmission of a motor power from a driving hollow shaft to a driving axle.

EP 2 626 597 A2 discloses an elastic double torsion coupling.

SUMMARY OF THE INVENTION

It is the object of the present invention to specify an arrangement for a series circuit of compensating couplings, which can be used as a drive constituent part of a rail vehicle and which requires a smaller installation space in comparison with the known prior art.

Said object is achieved by the features described below.

Advantageous refinements are specified in the dependent claims.

The invention relates to an arrangement for connecting two drive sides of a drive train of a rail vehicle.

A first drive side has a disk-shaped first coupling body at one of its ends. A second drive side has a disk-shaped second coupling body at one of its ends.

A disk-shaped intermediate body is arranged between the first coupling body and the second coupling body, wherein the intermediate body is coupled both to the first coupling body and to the second coupling body.

This coupling is configured in such a way that a rotational movement of one of the two drive sides is transmitted to the other drive side via the coupled or interconnected disk-shaped bodies "first coupling body-intermediate body-second coupling body".

Here, the term "disk-shaped" describes geometric bodies, the width and/or height or diameter of which is greater than the length and/or depth of which—naturally with the precondition that the intermediate body performs the function stated above.

In the ideal case, the term "disk-shaped" includes a geometric body with a basic shape of a cylinder the radius of which is (if appropriate, many times) greater than its height.

In a preferred configuration, the coupling bodies and the intermediate body are coupled to one another by intermeshed studs and recesses.

In a preferred configuration, the first coupling body surrounds the intermediate body in an annular manner. Correspondingly, the intermediate body surrounds the second coupling body in an annular manner. In other words, the two coupling bodies are arranged nested in one another and have a common axis of symmetry.

In a preferred configuration, the first coupling body has entraining studs on a side facing the intermediate body. Correspondingly, the second coupling body has entraining studs on a side facing the intermediate body. The intermediate body has recesses, which are designed for receiving the entraining studs of the first coupling body, on a side facing the first coupling body. The intermediate body has recesses, which are designed for receiving the entraining studs of the second coupling body, on a side facing the second coupling body.

The respective entraining studs and recesses are coupled to one another in such a way that a rotational movement of one of the two drive sides is transmitted to the other drive side via the coupled entraining studs and recesses.

In a preferred configuration, an elastomer is additionally applied or used as intermediate material in the coupling region.

In an alternative configuration to this, the coupling bodies and the intermediate body are coupled to one another via flexible elements.

To this end, preferably the first coupling body surrounds the second coupling body in an annular manner, while the intermediate body also surrounds the second coupling body in an annular manner. The intermediate body is arranged preferably and substantially parallel to the first coupling body.

To this end, preferably the first coupling body is connected to the intermediate body via flexible elements, while the intermediate body is connected to the second coupling body likewise via flexible elements.

These flexible elements preferably have a strip-shaped form.

To this end, preferably the first coupling body and the intermediate body have annularly encircling recesses for receiving flexible elements, which connect the first coupling body to the intermediate body.

Correspondingly, the second coupling body and the intermediate body have annularly encircling recesses for receiving flexible elements, which connect the first coupling body to the intermediate body.

The flexible elements couple or connect the coupling bodies and the intermediate body in such a way that a rotational movement of one of the two drive sides is transmitted to the other drive side via the coupled elements.

The present invention allows a series circuit of compensating couplings which requires only a small axial installation space. In this way, drive concepts can be converted in a very space-saving manner, it not being possible to achieve this with the solutions known hitherto from the prior art.

The present invention realizes improvements over the known prior art in terms of costs and track forces.

At the same time, by virtue of the present invention, weight is saved and an improved driving technique is achieved by virtue of the drive concept improved by the invention.

The present invention allows a series circuit of compensating couplings while maintaining a predefined coupling stiffness.

The present invention provides the possibility of using a greater range of stiffness and deformation of the coupling.

The present invention will be explained in more detail below by way of example with reference to a drawing.

BRIEF DESCRIPTION OF THE FIGURES

FIG. 1 shows a first basic illustration of the arrangement according to the invention, FIG. 2 shows a cross-sectional illustration of a first specific configuration of the arrangement according to the invention with respect to FIG. 1, FIG. 3 shows a second basic illustration of the arrangement according to the invention.

DETAILED DESCRIPTION OF THE INVENTION

Figure 4:
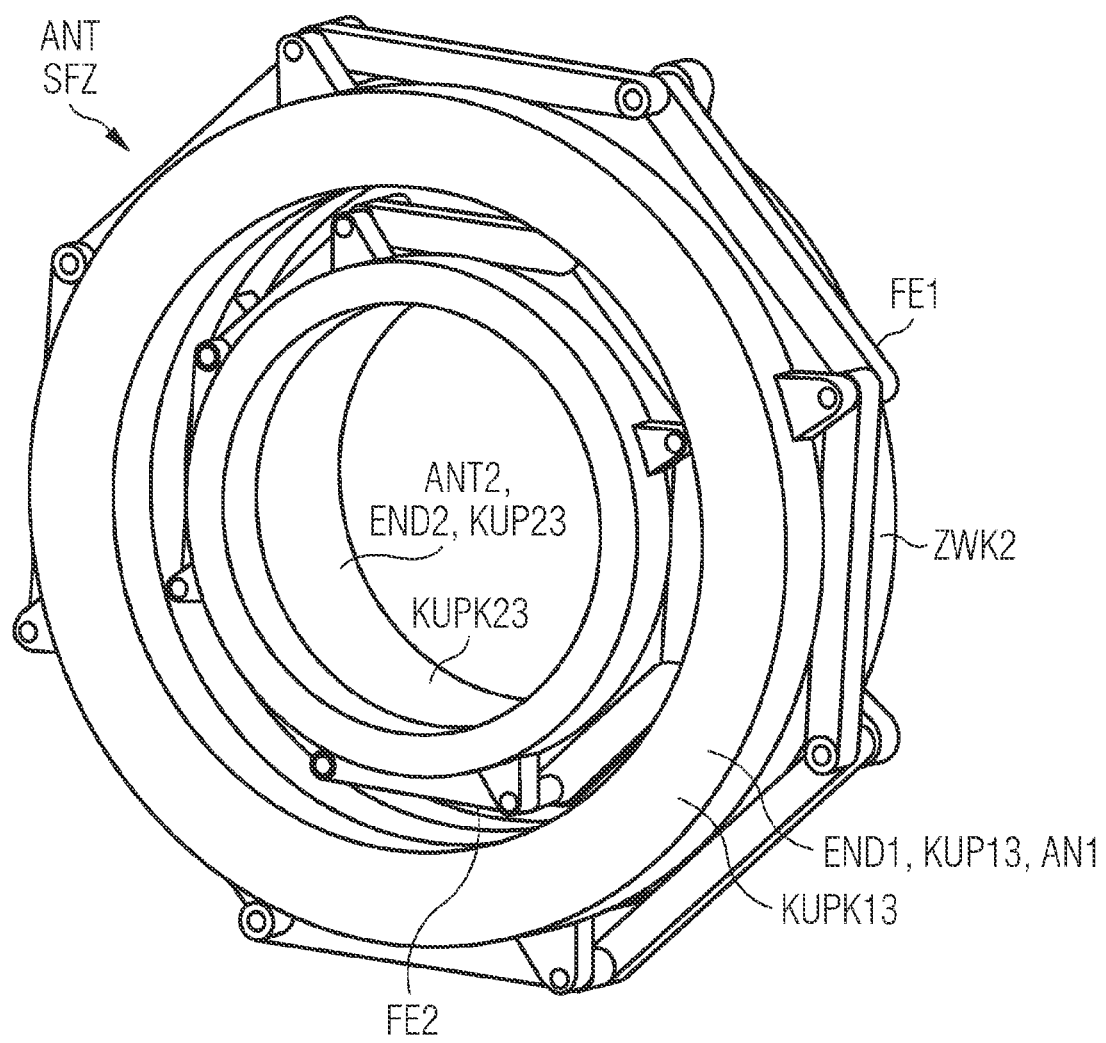
FIG. 4 shows a first view of a second specific configuration of the arrangement according to the invention with respect to FIG. 3.

FIG. 1 shows a first basic illustration of the arrangement according to the invention.

The arrangement shown is designed for connecting two drive sides ANT1, ANT2 of a drive train ANT of a rail vehicle SFZ.

A first drive side ANT1 is connected to an intermediate body ZWK1 via a first coupling KUP11. A second drive side ANT2 is connected to the intermediate body ZWK1 via a second coupling KUP21.

The couplings KUP11 and KUP21 shown are arranged without using a shaft and thus are arranged in a space-saving manner in the axial direction in relation to one another.

FIG. 2 shows a cross-sectional illustration of a first specific configuration of the arrangement according to the invention with respect to FIG. 1.

The arrangement shown is designed for connecting two drive sides ANT1, ANT2 of a drive train ANT of a rail vehicle SFZ.

A first drive side ANT1 has a disk-shaped first coupling body KUPK11 at one end END1 and thus on the connection side.

A second drive side ANT2 has a disk-shaped second coupling body KUPK21 at one end END2 and thus on the connection side.

A disk-shaped intermediate body ZWK1 is arranged between the first coupling body KUPK11 and the second coupling body KUPK21.

The first coupling body KUPK11 surrounds the intermediate body ZWK1 in an annular manner. The intermediate body ZWK1 in turn surrounds the second coupling body KUPK21 in an annular manner.

The first coupling body KUPK11 has entraining studs MNN1 arranged in an annularly encircling manner on a side facing the intermediate body ZWK1, while the second coupling body KUPK21 has entraining studs MNN2 arranged likewise in an annularly encircling manner on a side facing the intermediate body ZWK1.

The intermediate body ZWK1 correspondingly has recesses AUS1 that are arranged in an annularly encircling manner on a side facing the first coupling body KUPK11 and are designed for receiving the entraining studs MNN1 of the first coupling body KUPK11.

The intermediate body ZWK1 likewise has recesses AUS2, which are arranged in an annularly encircling manner on a side facing the second coupling body KUPK21 and are designed for receiving the entraining studs MNN2 of the second coupling body KUPK12.

The respective entraining studs MNN1, MNN2 and recesses AUS1, AUS2 are coupled to one another in such a way that a rotational movement of one of the two drive sides ANT1, ANT2 is transmitted to the other drive side via the coupled entraining studs MNN1, MNN2 and recesses AUS1, AUS2.

In the interaction of the entraining studs and recesses mentioned, the first coupling KUP11 is formed by the first coupling body KUPK11 and by the intermediate body ZWK1, while the second coupling KUP21 is formed by the second coupling body KUPK21 and by the intermediate body ZWK1.

The coupling bodies KUPK11 and KUPK21 shown and the intermediate body ZWK1 are arranged nested in one another in a space-saving manner and have a common axis of symmetry.

FIG. 3 shows a second basic illustration of the arrangement according to the invention.

The arrangement shown is designed for connecting two drive sides ANT1, ANT2 of a drive train ANT of a rail vehicle SFZ.

A first drive side ANT1 is connected to an intermediate body ZWK2 via a first coupling KUP13. A second drive side ANT2 is connected to the intermediate body ZWK2 via a second coupling KUP23.

In this arrangement, the two couplings KUP13, KUP23 are radially offset without using a shaft, but are arranged along a common axis of symmetry ROTA and thus in a space-saving manner axially in relation to one another.

FIG. 4 shows a first view of a second specific configuration of the arrangement according to the invention with respect to FIG. 3.

This arrangement is also designed for connecting two drive sides ANT1, ANT2 of a drive train ANT of a rail vehicle SFZ.

A first drive side ANT1 has a disk-shaped first coupling body KUPK13 at one end END1 and thus on the connection side.

A second drive side ANT2 has a disk-shaped second coupling body KUPK23 at one end END2 and thus on the connection side.

A disk-shaped intermediate body ZWK2 is arranged in addition to the first coupling body KUPK13 and the second coupling body KUPK23.

The first coupling body KUPK13 surrounds the second coupling body KUPK23 in an annular manner.

The intermediate body ZWK2 is arranged here substantially parallel to the first coupling body KUPK13.

The first coupling body KUPK13 is connected to the intermediate body ZWK2 via strip-shaped flexible elements FE1.

The intermediate body ZWK2 is connected to the second coupling body KUPK23 via strip-shaped flexible elements FE2.

The first coupling body KUPK13 and the intermediate body ZWK2 have annularly encircling recesses (in this instance bores) that serve for receiving the flexible elements FE1, which connect the first coupling body KUPK13 to the intermediate body ZWK2.

The second coupling body KUPK23 and the intermediate body ZWK2 have annularly encircling recesses (in this instance bores) for receiving the flexible elements FE2, which connect the second coupling body KUPK23 to the intermediate body ZWK2.

The flexible elements FE1, FE2 couple or connect the coupling bodies KUPK13, KUPK23 and the intermediate body ZWK2 in such a way that a rotational movement of one of the two drive sides ANT1, ANT2 is transmitted to the other drive side via the coupled elements.

In the interaction of the elements mentioned, the functionality of the first coupling KUP13 is formed by the first coupling body KUPK13, by the intermediate body ZWK2 and by the flexible elements FE1, while the functionality of the second coupling KUP23 is formed by the second coupling body KUPK23, by the intermediate body ZWK2 and by the flexible elements FE2.

The coupling bodies KUPK13, KUPK23 shown and the intermediate body ZWK2 are arranged nested in one another in a space-saving manner and have a common axis of symmetry.

Figure 5:
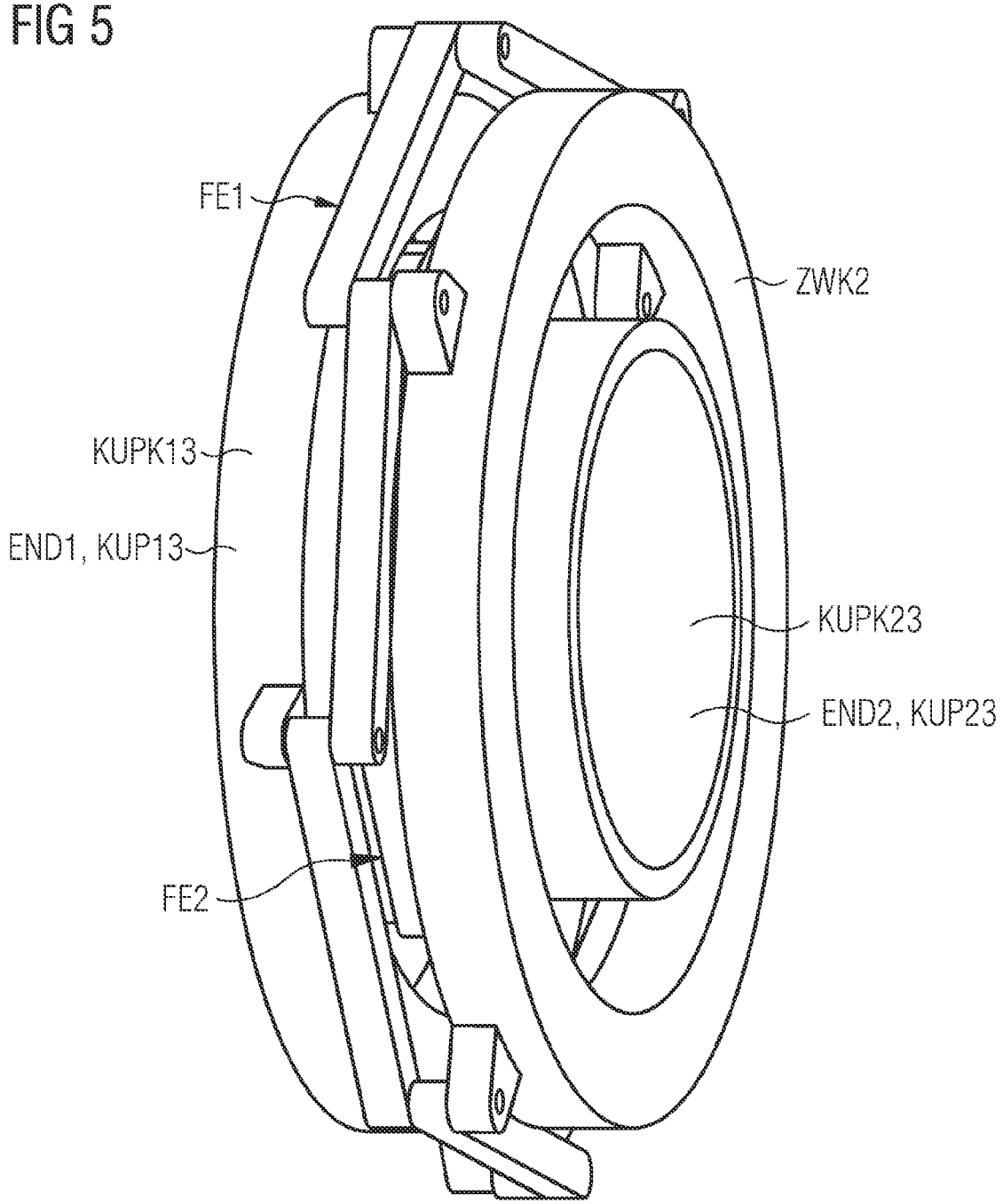
FIG. 5 shows a second view of the second specific configuration with respect to FIG. 4.

FIG. 5 shows a second view of the second specific configuration with respect to FIG. 4.

Figure 6:
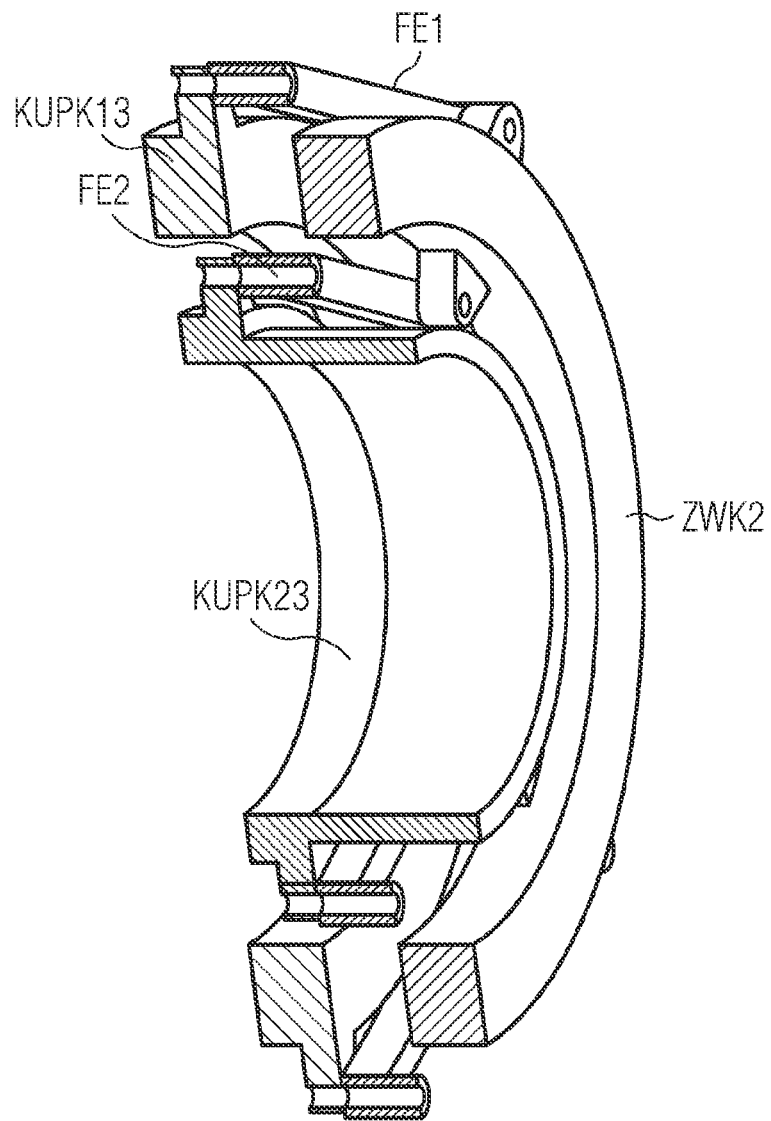
FIG. 6 shows a third view of the second specific configuration with respect to FIG. 4 and FIG. 5.
Figure 7:
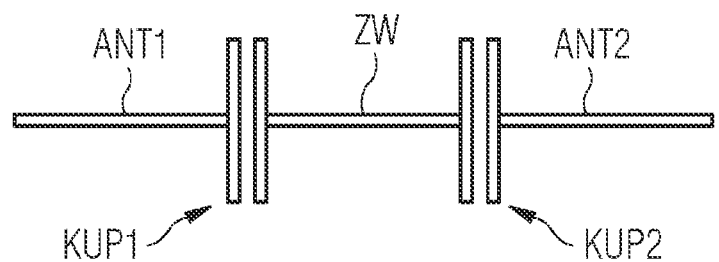
FIG. 7 shows the prior art of couplings connected in series that was described above in the introduction.

FIG. 6 shows a third view of the second specific configuration with respect to FIG. 4 and FIG. 5.

The invention claimed is:

1. An arrangement for connecting two drive sides of a drive train of a rail vehicle, the arrangement comprising:
   a first drive side having ends and a disk-shaped first coupling body at one of said ends of said first drive side;
   a second drive side having ends and a disk-shaped second coupling body at one of said ends of said second drive side;
   a disk-shaped intermediate body disposed between said first coupling body and said second coupling body;
   said intermediate body coupled to both said first coupling body and said second coupling body for transmitting a rotational movement of one of said first or second drive sides to another of said first or second drive sides through said first and second coupling bodies;
   said first coupling body annularly surrounding said second coupling body;
   said intermediate body annularly surrounding said second coupling body;
   said first, second and intermediate bodies having a common axis of symmetry and said second coupling body being nested in said first coupling body and being nested in said intermediate body in a space-saving manner.

2. The arrangement according to claim 1, wherein said first coupling body annularly surrounds said intermediate body.

3. The arrangement according to claim 1, which further comprises intermeshed studs and recesses coupling said first and second coupling bodies and said intermediate body to one another.

4. The arrangement according to claim 3, wherein:
   said intermeshed studs include entraining studs on a side of said first coupling body facing said intermediate body;
   said intermeshed studs include entraining studs on a side of said second coupling body facing said intermediate body;
   said recesses include recesses on a side of said intermediate body facing said first coupling body for receiving said entraining studs of said first coupling body;
   said recesses include recesses on a side of said intermediate body facing said second coupling body for receiving said entraining studs of said second coupling body; and
   respective entraining studs and recesses are coupled to one another for transmitting a rotational movement of one of said first or second drive sides to the other of said first or second drive sides through said coupled entraining studs and said recesses.

5. The arrangement according to claim 4, which further comprises flexible elements coupling said first and second coupling bodies and said intermediate body to one another.

6. The arrangement according to claim 1, wherein said intermediate body is disposed parallel to said first coupling body.

7. The arrangement according to claim 6, which further comprises:
   flexible elements connecting said first coupling body to said intermediate body; and
   flexible elements connecting said intermediate body to said second coupling body.

8. The arrangement according to claim 7, wherein said flexible elements are strip-shaped.

9. The arrangement according to claim 7, wherein:
   said first coupling body and said intermediate body have annularly encircling recesses for receiving said flexible elements connecting said first coupling body to said intermediate body;
   said second coupling body and said intermediate body have annularly encircling recesses for receiving said flexible elements connecting said second coupling body to said intermediate body; and
   said flexible elements couple or connect said first and second coupling bodies and said intermediate body for transmitting a rotational movement of one of said first or second drive sides to the other of said first or second drive sides through said coupled or connected first coupling body, second coupling body and intermediate body.

\* \* \* \* \*